R. M. JORDAN.
PISTON RING.
APPLICATION FILED FEB. 18, 1919.
1,343,828.  Patented June 15, 1920.
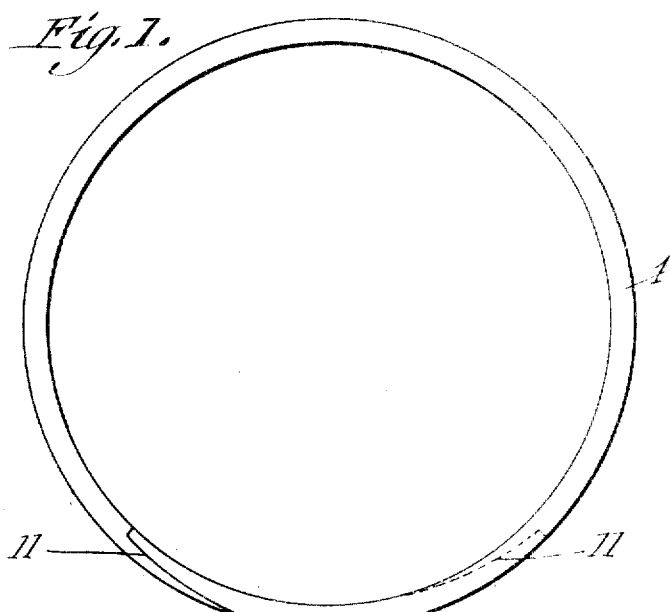
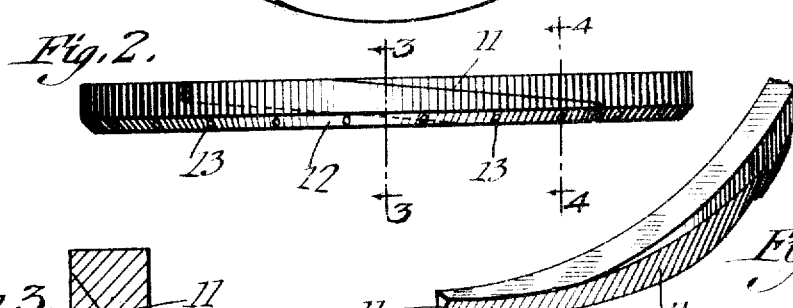
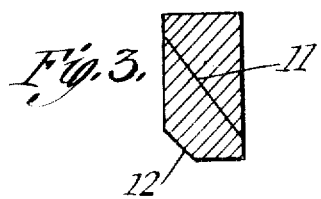
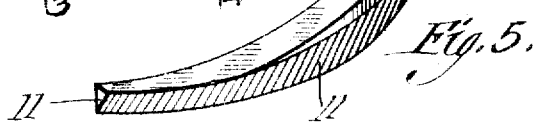
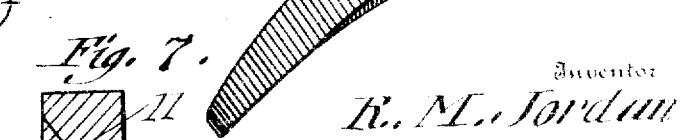
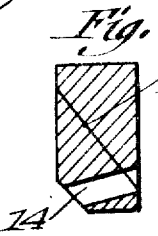
Inventor
R. M. Jordan

UNITED STATES PATENT OFFICE.

ROBERT M. JORDAN, OF COOPER, TEXAS.

PISTON-RING.

1,343,828.   Specification of Letters Patent.   Patented June 15, 1920.

Application filed February 18, 1919. Serial No. 277,781.

*To all whom it may concern:*

Be it known that I, ROBERT M. JORDAN, a citizen of the United States, residing at Cooper, in the county of Delta and State of Texas, have invented a new and useful Piston-Ring, of which the following is a specification.

This invention relates to metallic piston rings such as used in the pistons of hydrocarbon engines and the like, and it is more especially an improvement upon the joint structure, whereby expansion and contraction on the ring is permitted without leakage. An object of the invention is to provide a one piece concentric ring which will form an efficient seal at the joint and which has means whereby surplus oil will be collected during the reciprocation of the piston either for preventing it from entering the combustion chamber of the cylinder in excessive quantities or for facilitating the lubrication of the piston, according to the position and location of the rings on the piston.

With the foregoing and other objects in view which will appear as the description proceeds, the invention consists of certain novel details of construction and combinations of parts which will be hereinafter more fully described and pointed out in the claim, it being understood that various changes may be made in the construction and arrangement of the parts without departing from the spirit or sacrificing any of the advantages of the invention as set forth in the appended claim.

In the accompanying drawings the preferred form of the invention has been shown.

In said drawings:

Figure 1 is a plan view of the ring.

Fig. 2 is a side elevation thereof.

Fig. 3 is a section on line 3—3, Fig. 2.

Fig. 4 is a section on line 4—4, Fig. 2.

Fig. 5 is a perspective view of one end of the ring.

Fig. 6 is a similar view of the other end thereof.

Fig. 7 is a section through the lapping portions of the ring and showing a modified form of opening therethrough.

Referring to the figures by characters of reference 1 designates the body of the ring and the ends of the ring are cut away diagonally as at 11 to produce a long miter joint extending through approximately one quarter the circumference of the ring. The outer and inner faces of the lapping portions of the ring are flush and the same is true of the upper and lower faces of the end portions of the ring, as will be apparent by referring to Figs. 1 and 2.

One of the outer edges of the ring is beveled throughout the length thereof as shown at 12 and small recesses 13 can be formed in this beveled portion or, if preferred, and as shown in Fig. 7, openings 14 can be extended entirely through the ring. Any desired number and arrangement of these recesses or openings can be provided. These openings serve to collect surplus lubricant and prevent it from working into the cylinder under some conditions. Under other conditions the recesses will carry and distribute lubricant to insure uniform lubrication of the piston to which the ring is applied.

What is claimed is:

A piston ring formed in one piece and having elongated tapered beveled ends disposed in lapped relation, there being a bevel extending along one edge of the outer face of the ring and provided with depressions constituting oil accumlating and distributing means.

In testimony that I claim the foregoing as my own, I have hereto affixed my signature in the presence of two witnesses.

ROBERT M. JORDAN.

Witnesses:
 ESKA B. HULME,
 E. H. HUCKOBY.